United States Patent
van Lieshout

(10) Patent No.: US 9,777,775 B2
(45) Date of Patent: Oct. 3, 2017

(54) SCISSOR GEAR ASSEMBLY

(71) Applicant: VCST Industrial Products BVBA, Sint-Truiden (BE)

(72) Inventor: Steven van Lieshout, Geel (BE)

(73) Assignee: VCST Industrial Products BVBA, Sint-Truiden (BE)

( * ) Notice: Subject to any disclaimer, the term of this patent is extended or adjusted under 35 U.S.C. 154(b) by 346 days.

(21) Appl. No.: 14/597,053

(22) Filed: Jan. 14, 2015

(65) Prior Publication Data

US 2015/0198205 A1 Jul. 16, 2015

(30) Foreign Application Priority Data

Jan. 14, 2014 (NL) ........................ 2012082

(51) Int. Cl.
*F16H 55/18* (2006.01)
*F16D 3/10* (2006.01)

(52) U.S. Cl.
CPC .............. *F16D 3/10* (2013.01); *F16H 55/18* (2013.01); *Y10T 74/19916* (2015.01)

(58) Field of Classification Search
CPC .................................... F16H 55/18; F16D 3/10
See application file for complete search history.

(56) References Cited

U.S. PATENT DOCUMENTS

| | | | | |
|---|---|---|---|---|
| 4,189,951 A * | 2/1980 | Sauter | ................ | F16H 55/18 29/893.33 |
| 4,640,147 A * | 2/1987 | Yasukawa | ................ | F16H 55/18 74/409 |
| 4,688,441 A * | 8/1987 | Yasukawa | ................ | F16H 55/18 74/409 |
| 4,745,823 A * | 5/1988 | Morita | ................ | F16H 55/18 74/409 |
| 4,890,989 A * | 1/1990 | Zimmern | ................ | F01C 3/025 267/161 |
| 6,661,986 B2 * | 12/2003 | Kitayama | ................ | F16H 55/18 399/167 |
| 8,387,480 B2 * | 3/2013 | Park | ................ | F16H 55/18 74/409 |
| 8,621,951 B2 * | 1/2014 | Meier | ................ | F16D 1/116 74/409 |
| 2002/0121152 A1 | 9/2002 | White et al. | | |

(Continued)

FOREIGN PATENT DOCUMENTS

| | | |
|---|---|---|
| JP | S62 35165 | 2/1987 |
| JP | 2002 098220 | 4/2002 |
| WO | WO2008/142131 | 11/2008 |

*Primary Examiner* — David M Fenstermacher
(74) *Attorney, Agent, or Firm* — PatShegen IP

(57) ABSTRACT

A scissor gear assembly 1 has a main gear 3 and auxiliary gear 5 concentric to the main gear and in axial direction near the main gear. Further the assembly has a planar annular spring 7 being interrupted at one place. At the interruption the spring has two ends 7A and 7B. The spring is present between both gears and is with one end 7A connected to the main gear 3 and with the other end 7B to the auxiliary gear 5, so that both gears are connected to each other in rotation direction via the spring.

Each end 7A, 7B of the spring is provided with an extension 9 forming extra mass. These extensions are each provided with a slot 13. Because of these extra masses the spring torque will vary depending on the rotational speed of the gear assembly.

3 Claims, 4 Drawing Sheets

(56) References Cited

U.S. PATENT DOCUMENTS

| | | | | |
|---|---|---|---|---|
| 2014/0224053 A1* | 8/2014 | Buchleitner | ............ | F16H 55/17 74/445 |
| 2014/0360300 A1* | 12/2014 | Viechtbauer | ............ | F16H 55/18 74/445 |
| 2015/0047450 A1* | 2/2015 | Mitchum | ................ | F16H 55/18 74/445 |
| 2015/0198205 A1* | 7/2015 | Van Lieshout | ........... | F16D 3/10 74/445 |
| 2015/0316135 A1* | 11/2015 | Schnolzer | ............... | F16H 55/18 74/440 |
| 2016/0053881 A1* | 2/2016 | Zeller | .................... | F16H 55/18 74/440 |

* cited by examiner

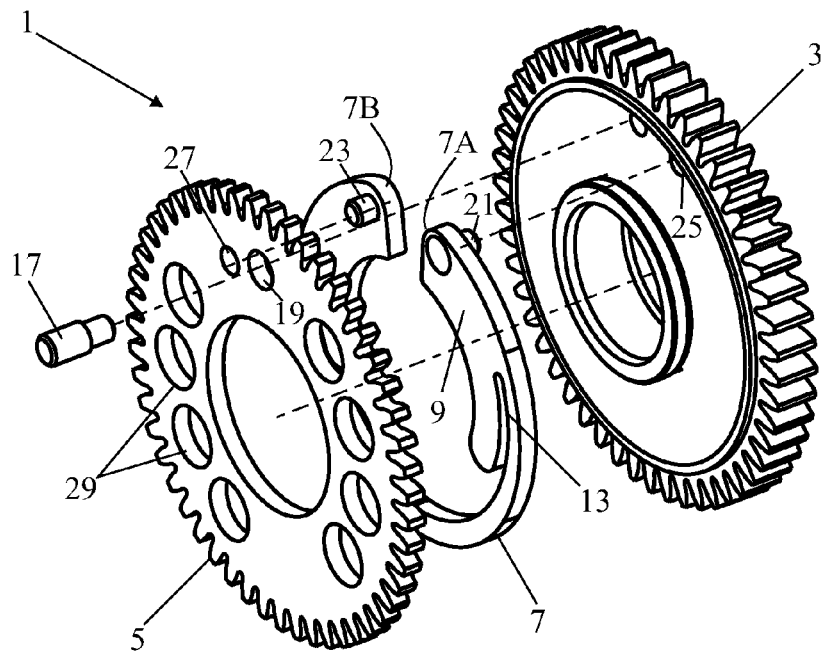
FIG. 1
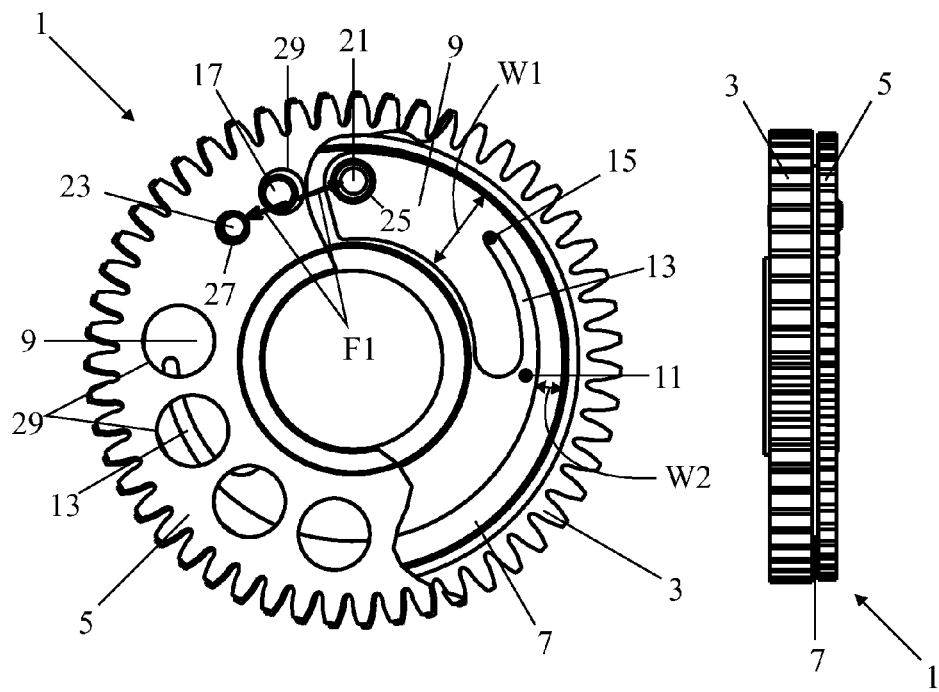
FIG. 2
FIG. 3

SCISSOR GEAR ASSEMBLY

TECHNICAL FILED OF THE INVENTION

The invention relates to a scissor gear assembly comprising:
a main gear;
an auxiliary gear concentric to the main gear and in axial direction near the main gear; and
a planar annular spring being interrupted at one place at which place the spring having two ends, which spring is present between both gears and with one end connected to the main gear and with the other end connected to the auxiliary gear, so that both gears are connected to each other in rotation direction.

BACKGROUND OF THE INVENTION

A scissor gear assembly is well known in the industry and often used in combustion engines for driving cam shafts, balancer shafts, fuel injection pumps or air compressors to prevent rattling noise because of load reversals and/or crank torsion vibrations. The scissor gear comprises a main and an auxiliary gear rotatable on a mutual axis and in rotation direction connected by a resilient member. The resilient member can be a spring with an annular shape. Preferably the spring is selected in this way that the negative torque due to load reversals and crank vibrations are eliminated. The scissor gear assembly has contact with both the driving flank and coast flank of its mating gear and because of this rattling is prevented. Especially the rattling noise at low rpm for instance at idling is noticeable and not wanted. Because of inertia of the gears and of the rotating components the rattling at high rpm will disappear or will not be found disturbing. In some applications a higher spring torque at higher rpm is beneficial because of higher torsion vibrations at higher rpm.

A disadvantage of using a scissor gear is that the constant load of the spring, and the introduction of an additional gear mesh will increase the level of high frequent noise (other than rattling noise) or introduce a high frequent whine noise. A further disadvantage is that because of the friction between the first and the second gear the hysteresis of the resilient member and the extra roll friction of the complementary gear mesh will give also energy losses. The energy losses will depend from the amount of spring load of the resilient member. So the selection of the spring load should be balanced, on one hand the spring load should be high enough to eliminate or reduce rattling noise to an acceptable level and on the other hand the spring load should be not too high introducing high frequent noise and causing unnecessary energy lost. Ideally the spring load should be in function of the engine speed. For some applications the maximum amount of spring load is only necessary at low rpm's or at idle speed. So at high rotational speed the ideal spring load should be reduced or eliminated to have a more efficient transmission and to have less whine noise. In other applications, rattling is still an issue at higher rotational speed because of progressive torsion vibrations. For latter applications the ideal spring torque should be progressive with the rotational speed so the transmission is as efficient as possible and having acceptable noise performance.

For most applications the goal of the invention is to find a scissor gear wherein the spring delivers a negative torque to eliminate or reduce rattle noise and that is significantly degressive in function of the rotational speed. For some other applications the goal of the invention is to find a scissor gear wherein the spring delivers a negative torque to eliminate or reduce rattle noise and that is significantly progressive in function of the rotational speed.

SUMMARY OF THE INVENTION

The solution is found by using a scissor gear assembly containing a spring according to the claim 1. The scissor gear assembly according to the present invention comprises an annual spring. One end of the spring is connected to the main gear and the other end is connected to the auxiliary gear. By opening or closing the spring ends a torque between the main and auxiliary gear is created. The force created by the spring depends on the amount of deflection (opening or closing) of the spring and the stiffness of the spring. By introducing extra mass at the ends of the spring there will be generated an extra centrifugal force while the spring is rotating around the axis of the scissor gear. Because the spring is only fixed on both ends this centrifugal force will introduce a torque between main gear and auxiliary gear, hereinafter called centrifugal torque. When the annular spring is fixed to the main gear and to the auxiliary gear the extra mass is generating a positive torque. Opening the spring the total spring torque, which is the sum of the static spring torque and the centrifugal torque, will reduce in case from the rotation speed of the scissor gear increases.

The length of the extra mass (the distance between the first point and the end) is designed in such a way that the extra mass still gives a beneficial result opening the spring ends because of the centrifugal force. Increasing the length further will at a certain point result in a negative effect of the amount of opening of the spring ends by the centrifugal forces because of opposite working forces.

A permanent pin is optional. The pin can permanently be assembled into the main gear or can be removed after assembly of the scissor gear in the engine. Preferably, the spring is sprung loaded by rotating the auxiliary gear relative to the main gear. The hole receiving the pin in the main gear corresponds with an opening in the auxiliary gear. The permanent pin can be pressed into the hole of the main gear. Preferably, the position of the hole in the main gear and the position of the opening in the auxiliary gear being the bias gear interacting with the pin is selected such that there is a small angular tooth offset of the first gear relative to the second gear. For a removable pin however it is better the teeth of the first gear and second gear are aligned. If a permanent pin is used a small offset of the teeth is wanted so that when the gear will be assembled in the engine and will mate with its counter gear. The mating gear tooth will force the gear tooth gap created between the first gear teeth and the second gear teeth. This against the spring force. In this way the hole in contact with the permanent pin of the second gear will lose its contact with the permanent pin. When the contact is lost the spring will distribute the negative torque over the auxiliary gear to the counter gear back to the main gear. Another optional function of the permanent pin can be to limit movement of the auxiliary gear during operation in the engine. While using the speed sensitive spring the centrifugal force at a certain speed can be that high that the centrifugal torque becomes larger than the static spring torque. While this happens the bias gear will be forced in opposite rotation direction. To prevent that the auxiliary gear is going full through the tooth backlash with the mating gear the movement can be limited by the opening in the auxiliary gear and the permanent pin.

Optionally the spring with the additional mass could be integrally formed with the second gear.

To make the effect of the centrifugal torque significantly in function of the rotational speed and the available space, the spring has to be designed with additional mass at the ends. The spring sheet thickness (s) needs to be selected carefully. A thicker spring will generate more centrifugal torque. However the deflection must be as high as possible and the negative torque must be limited.

It has been found that preferably the spring is designed with a relative small width and a relative thick sheet thickness. The shape of the annular spring is selected in such a way that the outside diameter is as large as possible. In this way maximum mass can be added radial inwards. The inner radius of the extra mass must be as small as possible to add maximum mass. The inner diameter is limited depending from the design of the scissor gear assembly.

A slot is created between the outer and inner diameter. This to keep the spring action (deflection) of the spring ends as high as possible. However a too width slot would reduce the amount of additional mass. The slot is made as narrow as possible to keep as much as possible mass but not too narrow so that the spring is still able to be produced with a cost efficient production process e.g. fine blanking.

BRIEF DESCRIPTION OF THE DRAWINGS

The invention will be further elucidated below on the basis of drawings. These drawings show embodiments of the scissor gear assembly according to the present invention. In the drawings:

FIG. 1 is an exploded view of a first embodiment of the scissor gear assembly according to the invention;

FIG. 2 shows the scissor gear assembly of FIG. 1 in front view;

FIG. 3 shows the scissor gear assembly of FIG. 1 in side view;

DETAILED DESCRIPTION OF THE DRAWINGS

Figure 4:
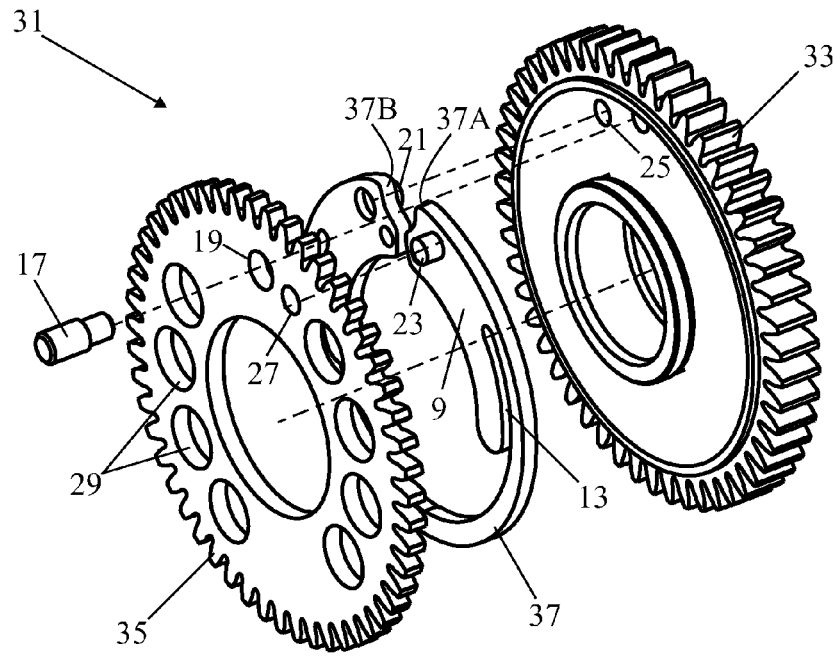
FIG. 4 is an exploded view of a second embodiment of the scissor gear assembly according to the invention.

In FIGS. 1 to 3 a first embodiment of the scissor gear assembly is shown in an exploded view and in a front and side view respectively. The scissor gear assembly 1 has a main gear 3 and auxiliary gear 5 concentric to the main gear and in axial direction near the main gear. Further the assembly has a planar annular spring 7 being interrupted at one place. At the interruption the spring has two ends 7A and 7B. The spring is present between both gears and is with one end 7A connected to the main gear 3 and with the other end 7B to the auxiliary gear 5, so that both gears are connected to each other in rotation direction via the spring.

Each end 7A, 7B of the spring 7 is provided with an extension 9 forming extra mass. These extensions are formed by parts of the spring extending from the respective end 7A, 7B to a first point 11 at distance from said end and having a width W1 larger than the width W2 of the spring at a place close to this part. These parts are each provided with a slot 13 starting from said first point 11 to a second point 15 at distance from the end, see FIG. 7. The width of the spring increases continuously from the ends towards the middle of the spring.

The gears 3 and 5 are provided with a stop limiting the rotational movement of the gears relative to each other. This stop is constituted by an axially extending pin 17, see FIGS. 1 and 2, connected to the main gear 3 and a hole 19 present in the auxiliary gear 5. The pin 17 extends in the hole 19. Boundaries of this hole limit the movement of the pin and thus the relative movement of the gears in two directions. The spring is provided with pins 21, 23 which fit in holes 25, 27 in the gears 3, 5.

Figure 7:
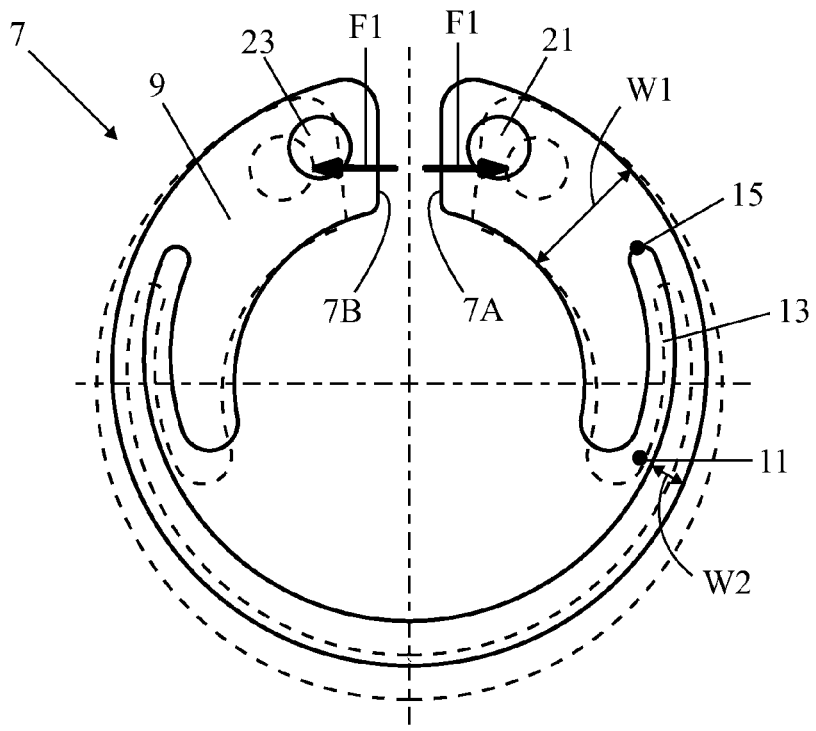
FIG. 7 shows the deflection of the spring of the assembly of FIG. 1.
Figure 9:
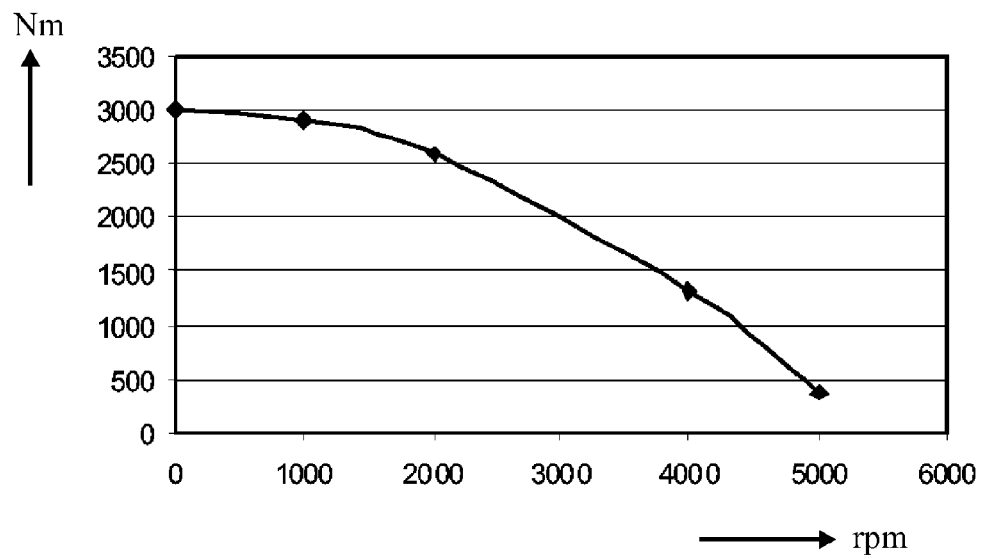
FIG. 9 is a diagram showing the spring torque in relation to the rotational speed of the gear assembly of FIG. 1.

The spring 7 is designed for being bended with the ends 7A, 7B away from other when the gear assembly is present in a gear train and the flanks of the gears of the assembly mate the flank of a further gear of the gear train. FIG. 7 illustrates the spring in relaxed condition and in bended state, the latter is indicated with intermittent lines. When assembling this scissor gear assembly 1 in a gear train the ends 7A, 7B of the spring 7 are bend away from each other by rotating the gears 3, 5 relative to each other. The gears act a force F1 on the pins 21 and 23 which will result in a torque which the spring acts on the gears in assembled condition During use the spring torque will decrease at increasing rotation speed because of the effect of the centrifugal force, see FIG. 9.

Holes or cavities 29 in the main and/or auxiliary gear compensate the imbalance of the scissor gear assembly caused by the spring.

Figures 5, 6:
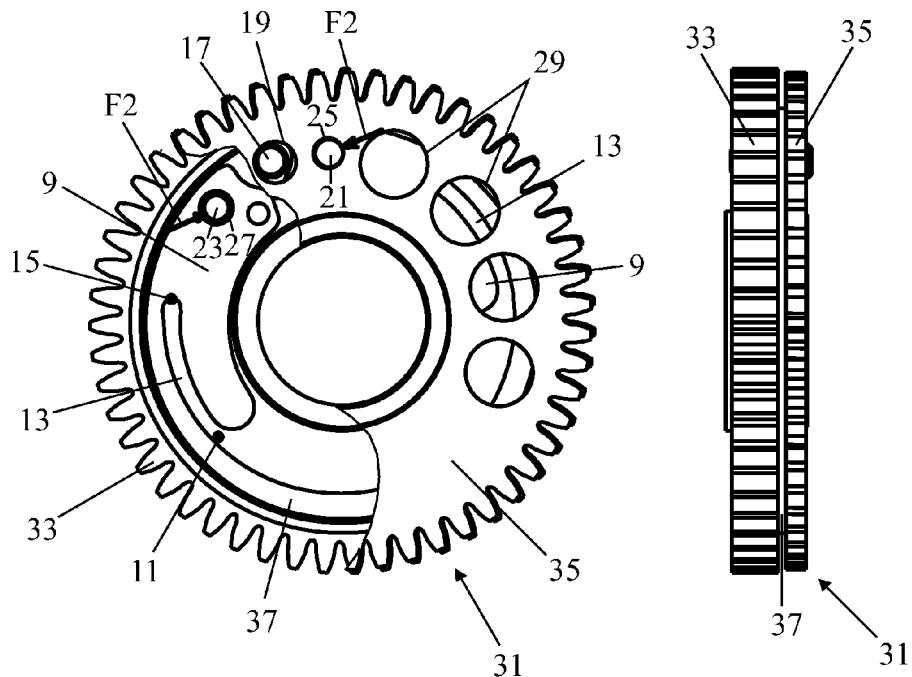
FIG. 5 shows the scissor gear assembly of FIG. 4 in front view.
FIG. 6 shows the scissor gear assembly of FIG. 4 in side view.

In FIGS. 4 to 6 a second embodiment of the scissor gear assembly is shown in an exploded view and in a front and side view respectively. Also this scissor gear assembly 31 has a main gear 33 and auxiliary gear 35 concentric to the main gear and in axial direction near the main gear. Further this assembly also has a planar annular spring 37 being interrupted at one place. At the interruption the spring has two ends 37A and 37B. Also the spring is present between both gears and is with one end 37A connected to the main gear 33 and with the other end 37B connected to the auxiliary gear 35.

Also this spring 37 is provided with extensions 9 formed by parts of the spring extending from the ends 37A and 37B and have a width W1 larger than the width W2 of the spring at a place close to these parts.

Also the gears 33 and 35 are provided with a pin 17 extending in a hole 19 and constituting a stop limiting the rotational movement of the gears relative to each other. The spring is also provided with pins 21, 23 which fit in holes 25, 27 in the gears 33, 35.

Figure 8:
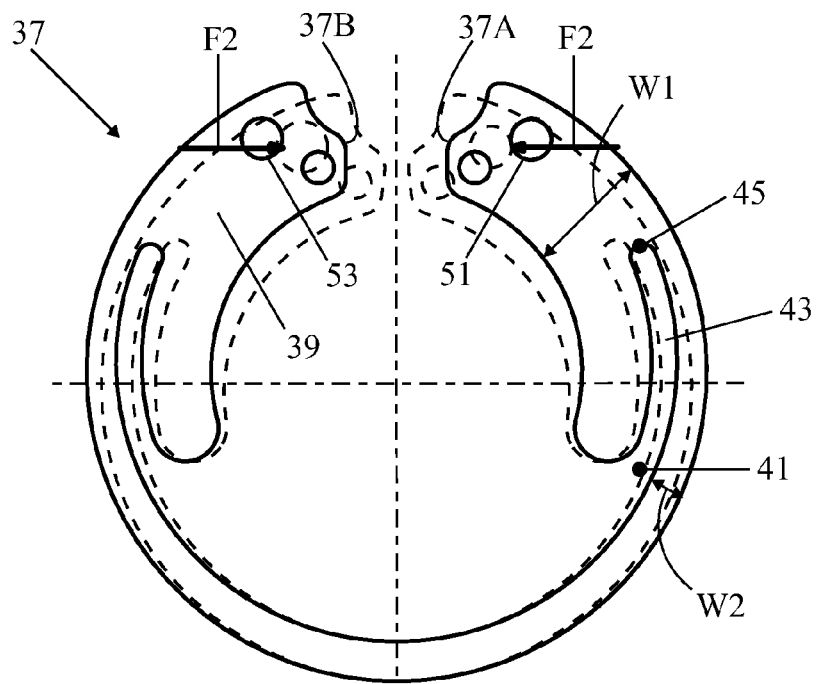
FIG. 8 shows the deflection of the spring of the assembly of FIG. 4.
Figure 10:
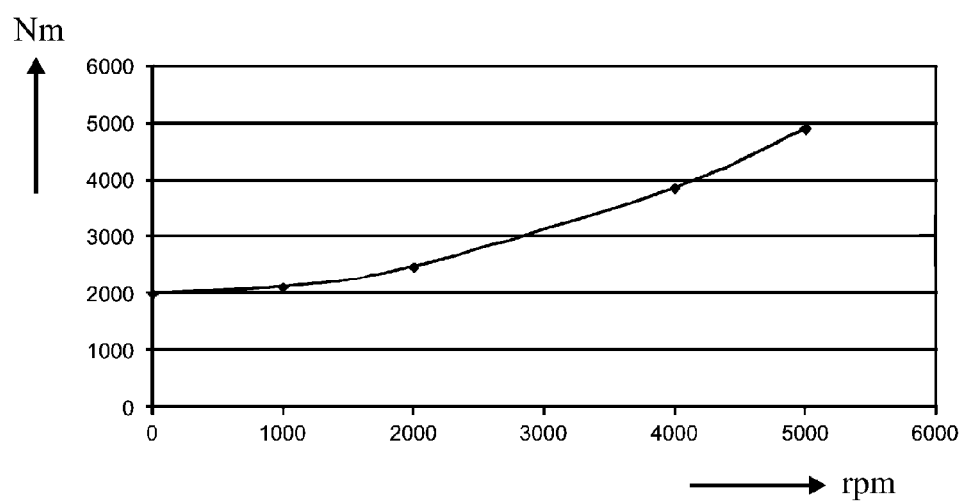
FIG. 10 is a diagram showing the spring torque in relation to the rotational speed of the gear assembly of FIG. 4.

However, the spring 37 of this assembly is designed for being bended with the ends 37A, 37B towards each other when the gear assembly is present in a gear train and the flanks of the gears of the assembly mate the flank of a further gear of the gear train. FIG. 8 illustrates the spring in relaxed condition and in bended state, the latter is indicated with intermittent lines. When assembling this scissor gear assembly 31 in a gear train the ends 37A, 37B of the spring are bend away from each other by rotating the gears 33, 35 relative to each other. The gears act a force F2 on the pins 21 and 23 which will result in a torque which the spring acts on the gears in assembled condition. During use the spring torque will decrease at increasing rotation speed because of the effect of the centrifugal force, see FIG. 10.

The torque created between the main gear and the auxiliary gear is depending from the spring force, the distances between the fixation points of the spring ends and the rotation axis of the gear and the angle between the lines through the rotational axis and the two fixation points of the spring ends. When the fixation points of the spring ends are close to each other the spring force will generate more torque than when the fixation points are far from each other because the projected distance to the rotational axis of the gear will be larger. For small deflection the material stress stays far enough below its yield point and the spring torque can be regarded as being linear with the stiffness of the spring and the amount of deflection of the spring ends. Preferably, the annual spring has the largest width in the middle area of the spring because the bending torque is the highest at the middle area of the spring and the width is reduced towards the spring ends. In this way the stress is distributed well over the spring and the deflection will be higher than the deflection of a spring with a constant section. A large deflection is beneficial. Because of material hardening the C-shaped spring geometry will have relative high geometrical tolerances. After hardening the spring opening tends to close due to internal material stress. The tolerance on the opening and the fixation points of the spring will have an impact on the amount of deflection in installed condition. So, if the deflection is large relative to the geometrical tolerances, the tolerances on spring force (thus negative torque generated by spring force) will be low. The direction of the negative torque that the spring is generating is depending of the fixation of the spring ends and the direction of winding the spring. The spring opening can be closed moving the spring ends to each other or the spring can be opened moving the spring ends away from each other. A closed spring in installed condition, with the spring ends forced to each other, will give a higher torque with the same spring force. So, the latter is preferable above a spring that is installed by opening the spring ends. For production or assembly reasons or using standardized rings like the 'Seeger' ring it can be considered to use a spring that is opened in installed condition.

The centrifugal force and so the opening of the spring will largely depend from the rotational speed of the scissor gear assembly ($F_{centrifugal}$=mass×rpm$^2$×r where r=distance mass to the axis). If the annular spring is wind in static assembly condition in a way such that the opening of the spring generates a negative torque, the negative torque will be reduced while the annular spring will rotate around the axis of the gear assembly by the centrical force that is induced by the mass of the annular spring. This because the centrifugal force also wants to open the spring. So the resulting torque that is distributed from the first to the second gear will be the static torque minus the centrifugal torque caused by the centrifugal force.

It has been found, for instance, that for driving a balancer shaft for a four cylinder diesel engine running on twice the engine speed the required negative torque preventing the rattling noise is relative low approximately 1.5-2.5 Nm. The 2 Nm is necessary for idling (500 rpm engine speed). Above 2500 the rattling noise will disappear or will be acceptable in relation to other engine noise. By designing a spring with extra weight on the ends which provides a static torque of 3 Nm, the total static+centrifugal torque could be reduced to 0 Nm at 5000 rpm engine speed. The required 2 Nm necessary at 2500 rpm is still available. Depending from the size of the gear and the available space it may be beneficial to increase the extra mass at the ends of the spring to reduce the torque at less high speeds.

If the centrifugal force of the spring at itself is that big that the opening of the spring by the centrifugal force is larger than the opening in the installed condition the total force (static+centrifugal) will be positive and the second gear will tend to go through it's backlash with its mating gear driving it's mating gear. There is found that by limiting the rotational movement of the main gear relative to the auxiliary gear the auxiliary gear is prevented going through its backlash while the torque delivered by the spring is reversing from direction above a certain rotational speed.

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims. For example: the spring can be integrally formed with the auxiliary gear or main gear.

The invention claimed is:

1. Scissor gear assembly comprising:
   a main gear;
   an auxiliary gear concentric to the main gear and in axial direction besides the main gear; and
   a planar annular spring being interrupted at one place and having two ends, said spring is present between both gears and with one end connected to the main gear and with the other end connected to the auxiliary gear, so that both gears are connected to each other, said planar annular spring having a first length extending between said two ends and a first width perpendicular to said first length;
   wherein at least one end of said two ends of said planar annular spring is provided with an extension forming extra mass, said extension extending from said at least one end to a first point along said first length at distance from said end having a second length, and said extension having a second width perpendicular to said second length,
   wherein said second width of said extension being larger than the first width of said planar annular spring, and
   wherein said second length of said extension being larger than said second width of said extension.

2. Scissor gear assembly according to claim 1, wherein said part is provided with a slot starting from said first point to a second point at distance from said at least one end.

3. Scissor gear assembly according to claim 1, wherein said assembly comprises an axially extending pin connected to the main gear and the auxiliary gear is provided with a hole in which the pin extends, which hole limits the relative movement of the main gear and the auxiliary gear in a first rotating direction and in a second rotating direction opposite to said first rotating direction.

* * * * *